(12) United States Patent
Carter et al.

(10) Patent No.: US 7,519,039 B2
(45) Date of Patent: Apr. 14, 2009

(54) TRANSMISSION USING A PLURALITY OF PROTOCOLS

(75) Inventors: Trent Carter, Indiatlantic, FL (US); Hooman Kashef, Melbourne, FL (US); Menzo Wentink, Utrecht (NL)

(73) Assignee: Xocyst Transfer AG L.L.C., Wilmington, DE (US)

( * ) Notice: Subject to any disclaimer, the term of this patent is extended or adjusted under 35 U.S.C. 154(b) by 50 days.

(21) Appl. No.: 11/683,526

(22) Filed: Mar. 8, 2007

(65) Prior Publication Data

US 2008/0080555 A1 Apr. 3, 2008

Related U.S. Application Data

(60) Provisional application No. 60/848,578, filed on Sep. 28, 2006.

(51) Int. Cl.
*H04J 3/00* (2006.01)
(52) U.S. Cl. .................. 370/338; 370/468; 370/528
(58) Field of Classification Search .......... 370/314, 370/345, 459, 462, 468, 473, 477, 498, 522, 370/528, 535, 537, 538, 338, 328, 329
See application file for complete search history.

(56) References Cited

U.S. PATENT DOCUMENTS

| | | | | |
|---|---|---|---|---|
| 6,895,255 | B1 * | 5/2005 | Bridgelall | 455/552.1 |
| 6,993,049 | B2 * | 1/2006 | Davies | 370/528 |
| 7,046,649 | B2 * | 5/2006 | Awater et al. | 370/338 |
| 7,218,648 | B1 * | 5/2007 | Jackson | 370/528 |
| 2002/0136183 | A1 * | 9/2002 | Chen et al. | 370/338 |
| 2004/0047324 | A1 * | 3/2004 | Diener | 370/338 |
| 2005/0025104 | A1 * | 2/2005 | Fischer et al. | 370/338 |
| 2005/0276241 | A1 * | 12/2005 | Kamerman et al. | 370/328 |

OTHER PUBLICATIONS

International Search Report PCT/US07/78747 filed Sep. 18, 2007.

* cited by examiner

*Primary Examiner*—Min Jung
(74) *Attorney, Agent, or Firm*—McDonnell Boehnen Hulbert & Berghoff LLP (57) ABSTRACT

Included are embodiments for communicating data using a plurality of formats. At least one embodiment of a method includes transmitting a plurality of first format data frames with a predetermined time period between transmitted first format data frames and determining a duration of the time period between the transmitted first format data frames. Similarly, some embodiments include fragmenting a second format data frame into a plurality of second format subframes such that the second format subframes may be transmitted during the time period between the transmitted first format data frames.

23 Claims, 9 Drawing Sheets

TRANSMISSION USING A PLURALITY OF PROTOCOLS

CROSS REFERENCE

This application claims the benefit of U.S. Provisional Application No. 60/848,578, filed Sep. 28, 2006, which is hereby incorporated by reference in its entirety.

BACKGROUND

As wireless communications have evolved, various protocols have been developed to provide different features. As many devices are now configured to communicate using different wireless protocols, interference can occur when the protocols operate in similar and/or overlapping frequencies during a similar time period. As interference can distort and/or inhibit a communication, a heretofore unaddressed need exists in the industry to address the aforementioned deficiencies and inadequacies.

SUMMARY

Included are embodiments for communicating data using a plurality of formats. At least one embodiment of a method includes transmitting a plurality of first format data frames, the plurality of first format data frames being transmitted with a time period between transmitted first format data frames and determining a duration of the time period between the transmitted first format data frames. Similarly, some embodiments include fragmenting a second format data frame into a plurality of second format subframes such that the second format subframes may be transmitted during the time period between the consecutively transmitted first format data frames.

Similarly, an embodiment of a method includes transmitting a plurality of first format data frames the plurality of first format data frames being transmitted with a predetermined time period between consecutively transmitted first format data frames and determining a transmit schedule associated with the first format data frames. Some embodiments of the method include delaying transmission of a second format data frame a predetermined time after one of the plurality of first format data frames.

Also included are embodiments of a communications device for communicating data using a plurality of formats. At least one embodiment of a device includes first logic configured to transmit a plurality of first type data frames, the plurality of first type data frames being transmitted with a predetermined time period between consecutively transmitted first type data frames and a second logic configured to transmit a second type data frame, the second logic further configured to determine a duration of the time period between the consecutively transmitted first type data frames, the second logic further configured to fragment the second type data frame into a plurality of subframes such that the second type data subframes may be transmitted during the time period between the consecutively transmitted first type data frames.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
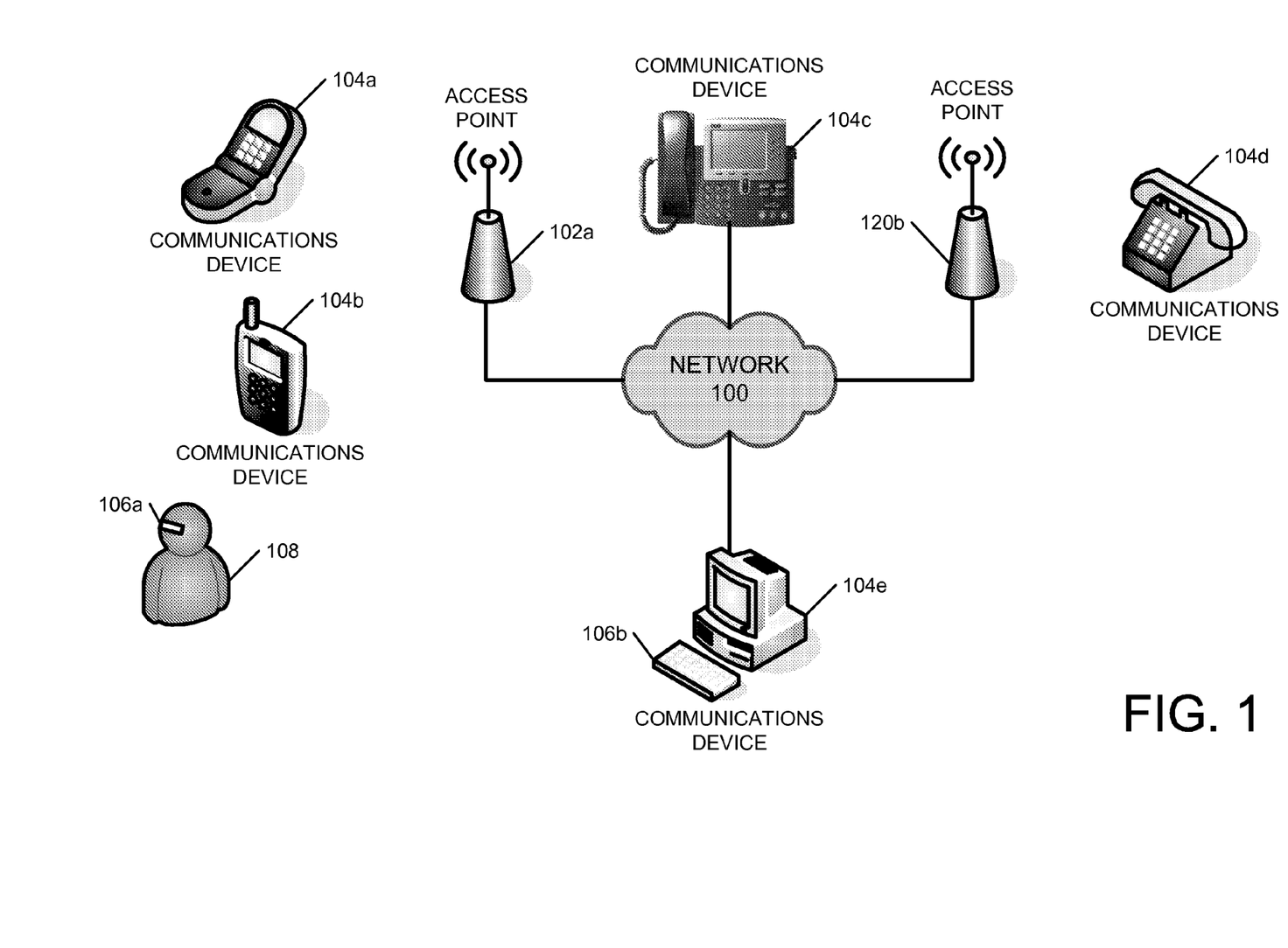
FIG. 1 is a diagram illustrating an exemplary embodiment of a network configuration that may be utilized for wireless communications.

FIG. 1 is a diagram illustrating an exemplary embodiment of a network configuration that may be utilized for wireless communications. As illustrated in the nonlimiting example from FIG. 1, network 100 may be coupled to Access Points 102*a* and 102*b*. Access Points 102*a* and 102*b* can be configured to provide wireless communications to communication devices 104*a*, 104*b*, 104*c* and/or 104*d*. More specifically, depending on the particular configuration, Access Points 102*a* and/or 102*b* may be configured for providing WIFI services, WiMAX services, wireless SIP services, Bluetooth services and/or other wireless communication services. Additionally, communication device 104*b* may be coupled to network 100 (via a wired and/or wireless connection) for storing communications between communication device 104*e* and/or another communication device 104 coupled to network 100.

Network 100 may include a Public Switched Telephone Network (PSTN), a Voice over Internet Protocol (VoIP) network, an Integrated Services Digital Network (ISDN), a cellular network, and/or other mediums for communicating data between communication devices. More specifically, while communications devices 104a and 104b may be configured for WIFI communications, a communications device 104e may be coupled to network 100 and may facilitate communication between users on a communications device 104a and users on a communications device 104e, even though communications device 104e may be configured for PSTN communications, as opposed to VoIP communications. Additionally, while a communications device 104a may be configured to communicate with communications device 104d via a WIFI or IEEE 802.11 (e.g., 802.11b, 802.11g, 802.11n, etc.) protocol, communications device 104b may also be able to communicate with a wireless ear piece 106a being utilized by a user 108 and/or other device using a Bluetooth protocol. Similarly, the communications device 104e may be configured to communicate with wireless keyboard 106b via a Bluetooth protocol. Other Bluetooth enabled devices may also be utilized in the configuration of FIG. 1. As these protocols may be configured to operate in similar frequencies, utilization of these protocols concurrently may cause data interference, thereby reducing the quality of each communication.

Figure 2:
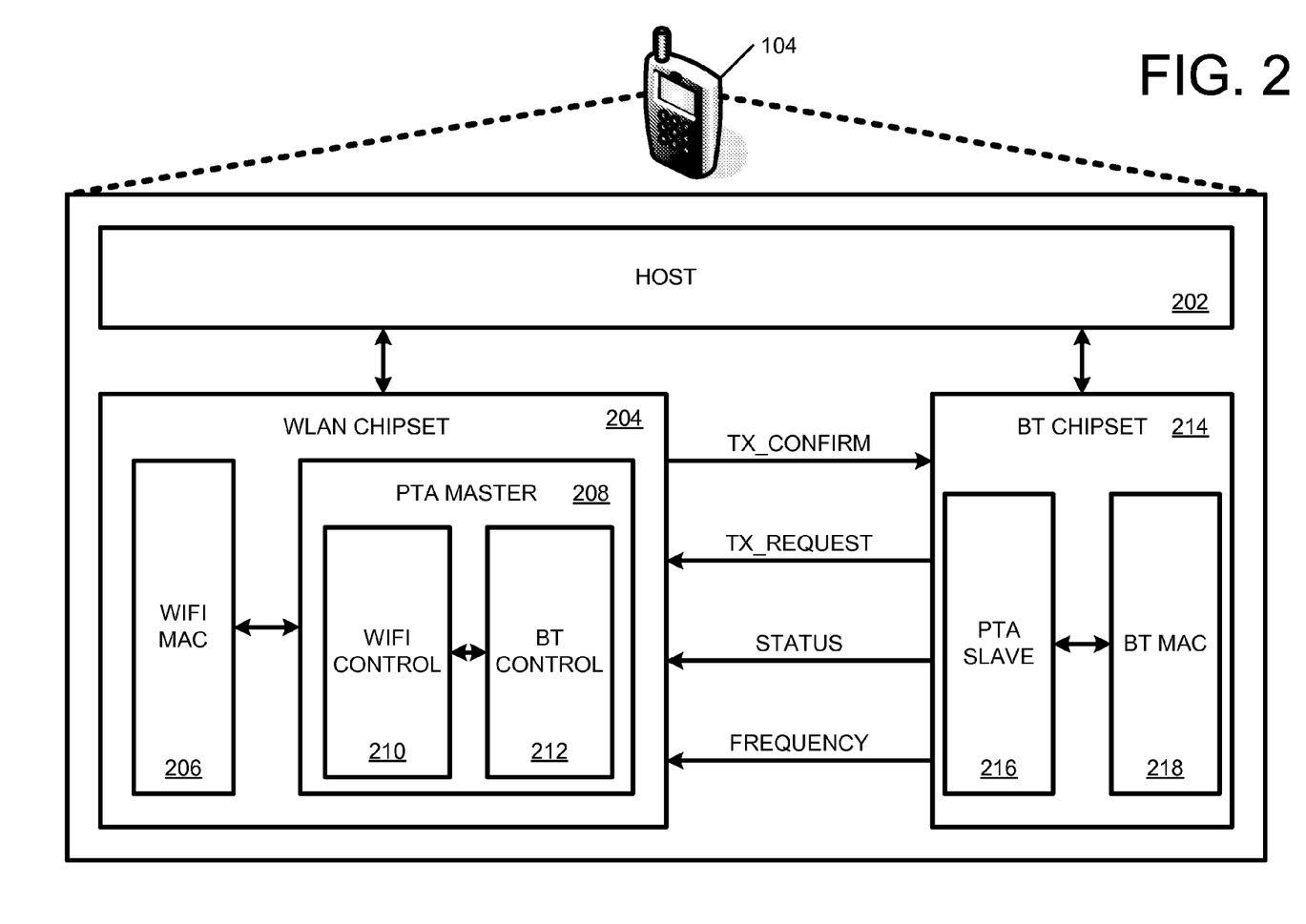
FIG. 2 is a diagram illustrating an exemplary embodiment of a communications device that may be configured to operate in the network from FIG. 1.

FIG. 2 is a diagram illustrating an exemplary embodiment of a communications device that may be configured to operate in the network from FIG. 1. As illustrated in the nonlimiting example of FIG. 2, the communications device 104 may include a host 202. Additionally included is a Wireless Local Area Network (WLAN) chipset 204, which may include a WIFI Media Access Control (MAC) and a Packet Traffic Arbitration (PTA) master 208. The PTA master 208 can include a WIFI control component 210 and a Bluetooth (BT) control component 212.

Also included with the communications device 104 is a Bluetooth chipset 214. The Bluetooth chipset 214 may include a PTA slave component 218 and a Bluetooth MAC component 218. The WLAN chipset 204 and the BT chipset 214 may be configured to communicate data signals to coordinate various protocols such as 802.11 data and Bluetooth data. At least a portion of the signals are included in Table 1, below.

TABLE 1

Signals communicated in a communications device 104

| Pin name | Data direction | Description |
|---|---|---|
| Tx_request | BT to WLAN | May be asserted during BT receive or transmit. On receipt of a tx_request signal, the 802.11 control may generate a tx_confirm signal containing a status value that is either allowed or denied. |
| Status | BT to WLAN | Pulsed if a BT slot is high priority. After pulsing, indicates BT radio mode (transmit or receive). |
| Tx_confirm | WLAN to BT | Transmission confirmation. De-asserted when the PTA modules attempt to prevent the BT module transmission. The BT module may not initiate a transmission when the tx_confirm is de-asserted, as sampled before the start of the slot, but may continue transmission if asserted during the slot. In response to a tx_request signal, Bluetooth control may generate a tx_confirm signal that includes a status value that is either allowed or denied. |

TABLE 1-continued

Signals communicated in a communications device 104

| Pin name | Data direction | Description |
|---|---|---|
| Frequency | BT to WLAN | This optional frequency overlap signal is asserted when the BT transceiver hops into restricted channels that are defined by a coexistence mechanism. |

In operation, the BT chipset 214 may send a tx_request to the PTA master 208, indicating a request to transmit Bluetooth data. The PTA master 208 can respond with an indication to transmit or to refrain from transmitting at this time (e.g., tx_confirm). The Bluetooth data may then be transmitted. A status signal may be sent from the BT chipset 214 to the PTA master 204 if the data to be transmitted is determined to be high priority data. Additionally, as discussed in more detail below, the communications device 104 may also be configured for dynamic fragmentation, delayed transmission, and/or other actions, depending on the particular configuration.

One should also note that, while not illustrated in FIG. 2, communications device 104 may include other components, such as a processor, display interface, input interface, output interface, data storage, local interface (e.g., a bus), one or more memory components, such as RAM, DRAM, flash memory, and/or other volatile and nonvolatile memory components. Additionally, the communications device 104 may include one or more programs (embodied in software, hardware, firmware, etc.) for execution by the processor. The programs may be located with the memory components, data storage, and/or elsewhere. Other components may be included that facilitates communication of data with the communications device 104.

One should also note that components illustrated in FIG. 2 are illustrated for purposes of illustration and are not intended to limit the scope of this disclosure. More specifically, while PTA master 208 is illustrated as residing in the WLAN chipset 204, this is a nonlimiting example. More specifically, in at least one embodiment, the PTA master 208 may reside on an Application Specific Integrated Circuit (ASIC), at the host, and/or elsewhere. Similarly, other components described with respect to the communications device 104 may differ in practice, depending on the particular configuration.

Figure 3:
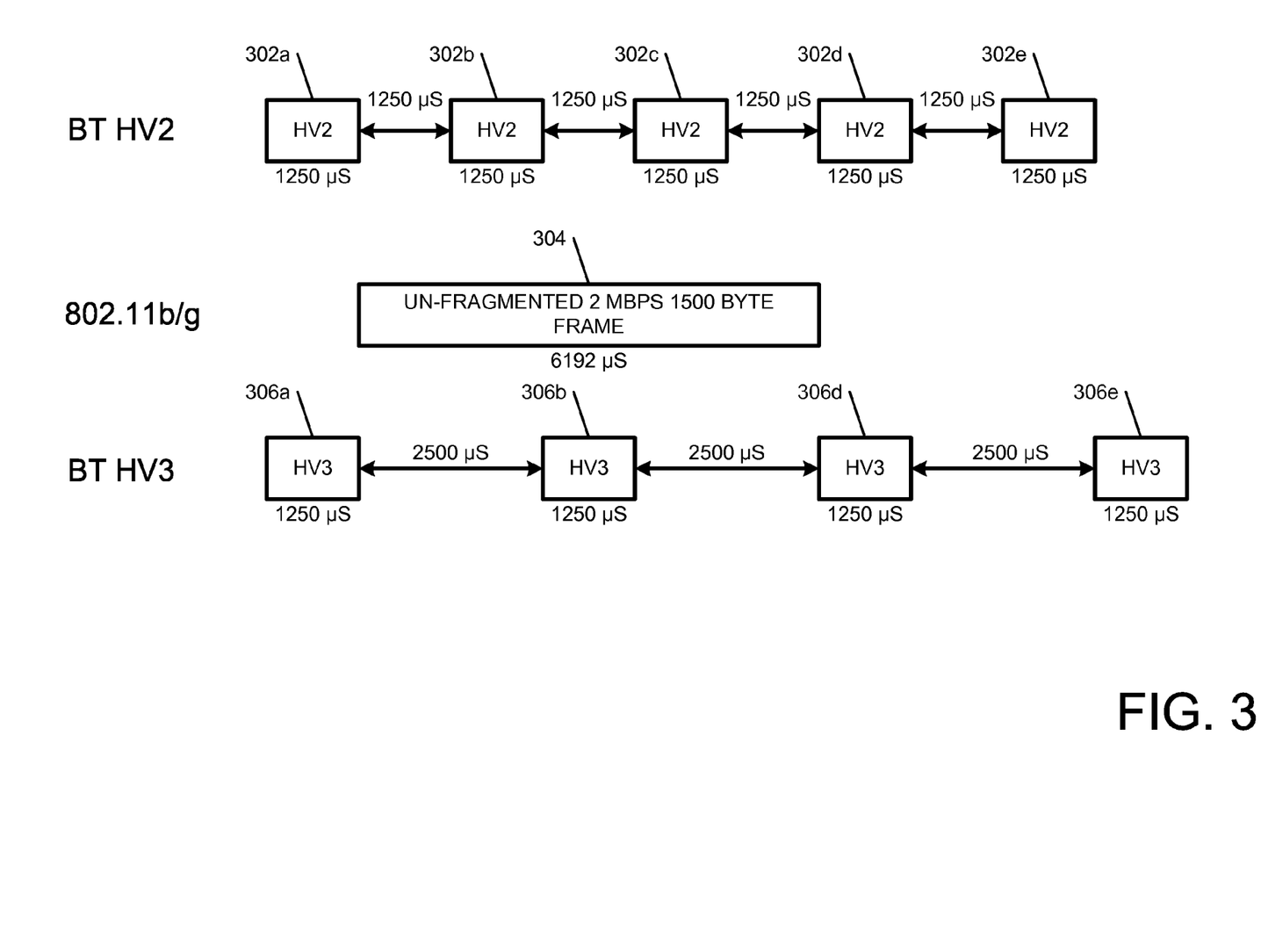
FIG. 3 is a diagram illustrating an exemplary embodiment of data frames, such as may be communicated by the device from FIG. 2.

FIG. 3 is a diagram illustrating an exemplary embodiment of data frames, such as may be communicated by the device from FIG. 2. More specifically, as illustrated in the nonlimiting example of FIG. 3, Bluetooth voice variant High Quality Voice 2 (HV2) may be configured to transmit data packets that are 1250 μs in length. Additionally, HV2 data frames 302a-302e may be sent at 1250 μs intervals, with data frames 302a and 302b, 302b and 306c, etc being consecutively transmitted data frames. 802.11 data frames 304, on the other hand may include one or more frames that may be configured to be sent at regular or irregular intervals. Bluetooth HV3 data frames 306a-306e, may be sent at regular intervals of 2500 μs, with the data frames being sent at 1250 μs, with data frames 306a and 306b, 306b and 306c, etc. being consecutively transmitted data frames.

One should note that, depending on the particular configuration, the interval times and/or data frame times may differ than those described with regard to FIG. 3. Similarly, the amount of data transmitted in a data frame may differ, depending on the particular configuration. The values given for these parameters are included for purposes of illustration and are not intended to limit the scope of this disclosure.

Figure 4:
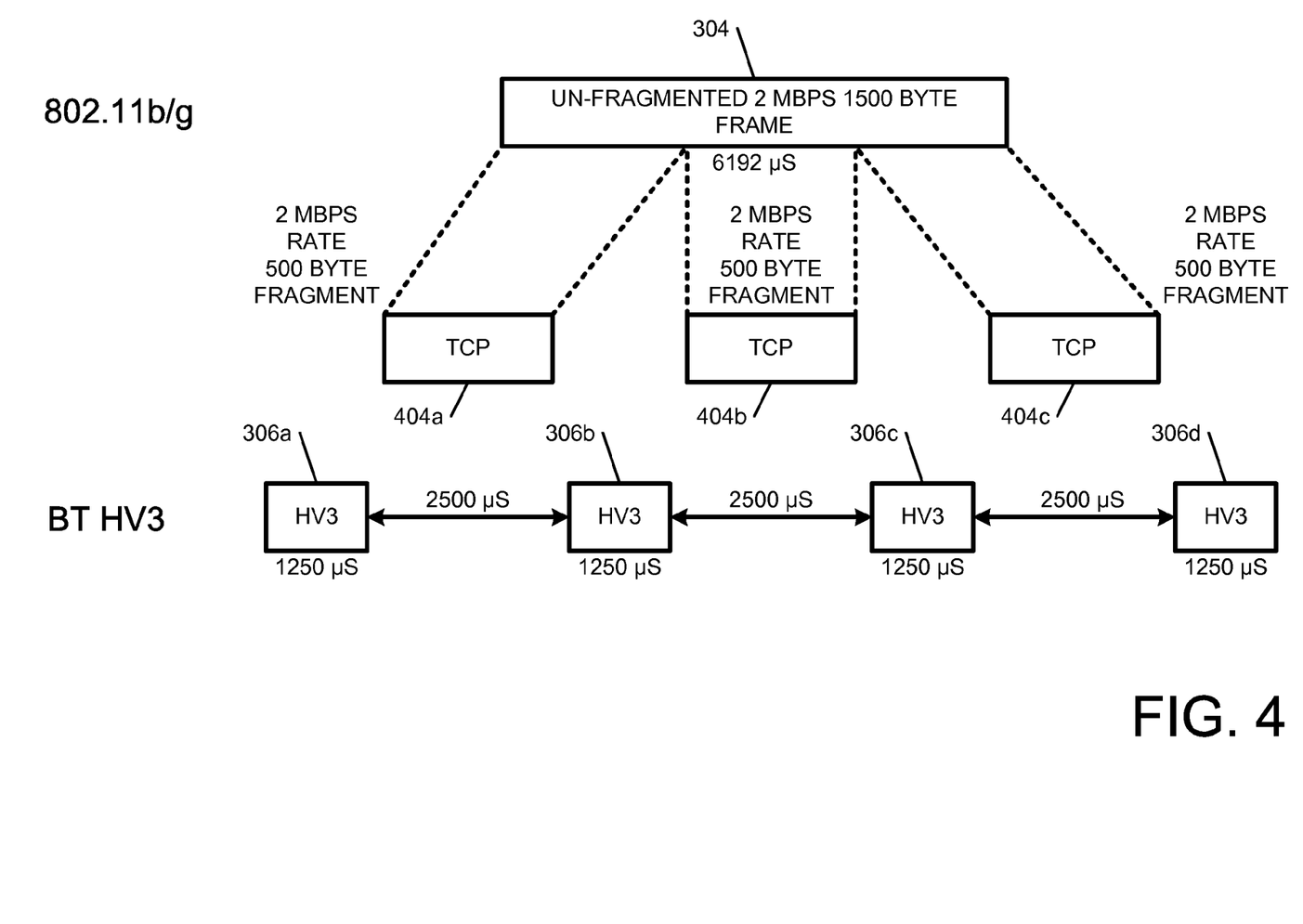
FIG. 4 is a diagram illustrating an exemplary embodiment of fragmenting a data frame, such as a data frame from FIG. 3.

FIG. 4 is a diagram illustrating an exemplary embodiment of fragmenting a data frame, such as a data frame from FIG. 3. As illustrated in the nonlimiting example of FIG. 4, the 802.11 data frame 304 may be fragmented for concurrent transmission with Bluetooth HV3 data. More specifically, in at least one nonlimiting example, the PTA master 208 (FIG. 2) may determine that an 802.11 data frame will take more time to transmit than the length of time between any two Bluetooth data frames (e.g., 306a and 306b, 306b and 306c, 306c and 306d). As such, interference may occur if the 802.11 data frame 304 is transmitted.

In such a scenario, the PTA master component 208 may determine the transmission (and/or receipt) cycle times for the Bluetooth data 306. From this determination, the PTA master component 208 can determine the time between any two Bluetooth data frames 306. The PTA master component 208 can then instruct the WiFi MAC 206 to fragment the 802.11 data.

In at least one exemplary embodiment, the PTA master component 208 may be configured to determine whether the 802.11 data frame 304 can be transmitted in a time period between the Bluetooth data frames 306. If the PTA master component 208 determines that the 802.11 data frame 304 cannot be transmitted during a time interval of that duration, the PTA master component 208 can instruct the WiFi MAC 206 to fragment the 802.11 data frame 304 into two subframes 404. The PTA master component can then determine whether the subframes can be transmitted within the determined timer interval. If not, the process continues with the PTA, instructing the WiFi MAC 206 to fragment the subframes into second tier subframes, third tier subframes, etc. and determining whether the newly fragmented frames can be transmitted.

Similarly, some embodiments may be configured to determine whether the 802.11 data frame 304 may be transmitted during an interval between any two Bluetooth data frames 306. If the PTA master component 208 determines that the data frame 304 cannot be transmitted in this time period, the PTA master component 208 can determine a number of subframes 404 that will allow transmission of the data subframes 404 during the time periods between transmissions of the Bluetooth data frames 306. Still some embodiments may be configured to, upon a determination that the data frame 304 cannot be transmitted between Bluetooth data frames 306, fragment the 802.11 data frame 304 into enough subframes 404 that will likely ensure transmission times that are shorter than the time periods between the Bluetooth data frames 306.

One should note that while the nonlimiting example of FIG. 4 illustrates transmitting data at 2 Mega-bits per second (Mpbs), this is also a nonlimiting example. More specifically, depending on the particular version of 802.11 being utilized, the following data rates, among others, may be utilized, as illustrated in Table 2. Additionally, while frame sizes may include 1500 Maximum Transmission Units (MTUs), this is also a nonlimiting example, depending on the 802.11 version being utilized.

TABLE 2 exemplary data speeds for a plurality of 802.11 versions

| Protocol | Speed |
|---|---|
| 802.11 | 1, 2 |
| 802.11b | 1, 2, 5.5, 11 |
| 802.11b/g | 1, 2, 5.5, 6, 9, 11, 12, 18, 24, 36, 48, 54 |
| 802.11n | 1, 2, 5.5, 7.2, 10.8, 11, 14.4, 21.7, 28.9, 43.3, 57.8, 65, 72.2 |

Figure 5:
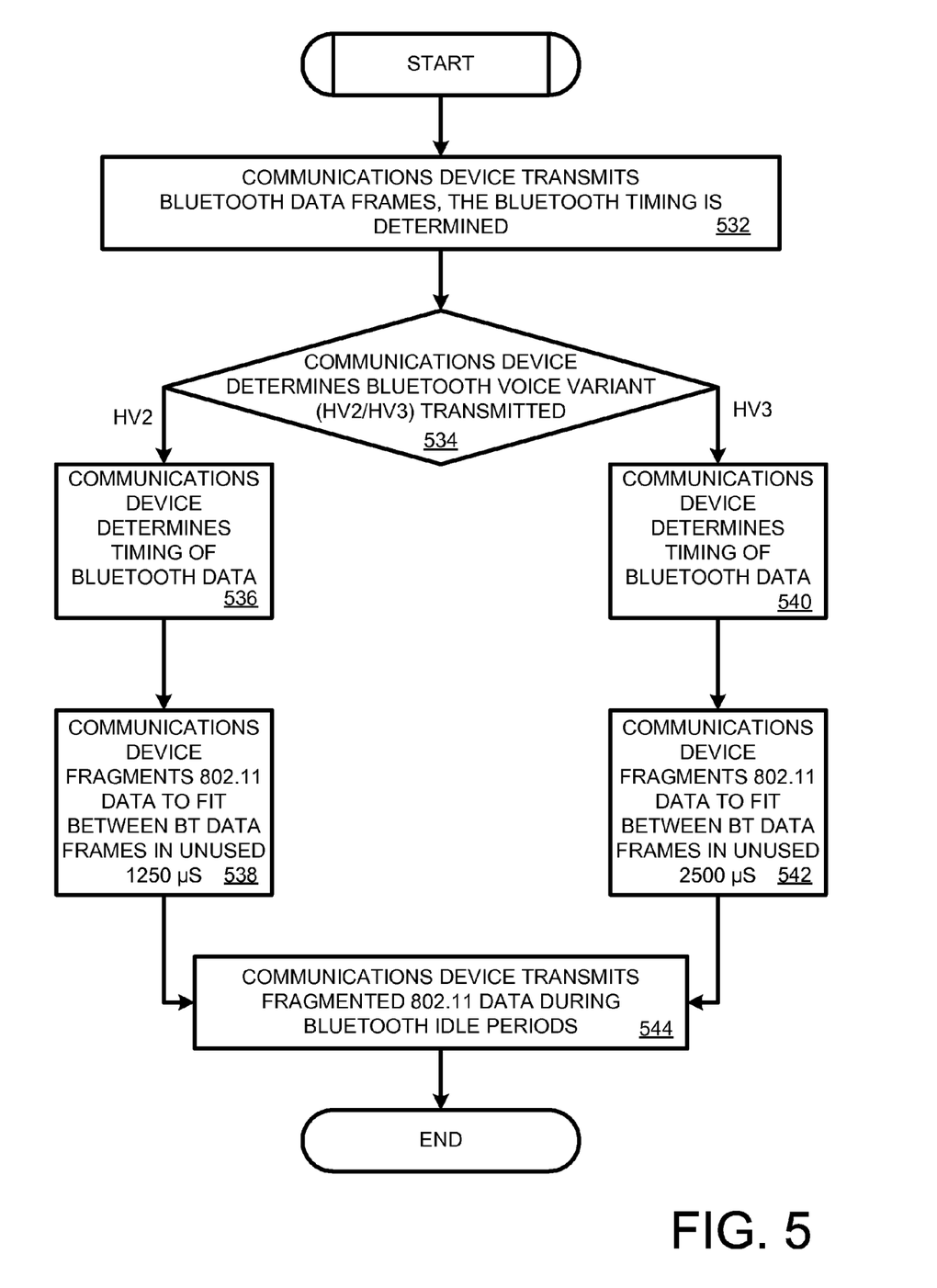
FIG. 5 is a flowchart illustrating an exemplary process that may be utilized for communicating data in a plurality of protocols, such as in the network from FIG. 1.

FIG. 5 is a flowchart illustrating an exemplary process that may be utilized for communicating data in a plurality of protocols, such as in the network from FIG. 1. As illustrated in the nonlimiting example of FIG. 5, the communications device 104 can begin transmitting a Bluetooth data frame 302, 306 and the Bluetooth transmission timing can be determined (block 532). The communications device 104 can then determine the Bluetooth variant (HV2/HV3) of the transmitted Bluetooth data 302, 306 (block 534). Depending on the particular configuration, the decision between HV2 and HV3 may be taken after at least two Bluetooth transmissions, because a measure of the time between the Bluetooth data frames may be needed. While this information may be known in advance through a management interface, this is not a requirement. If the transmitted data is HV2 data, the communications device 104 can determine timing of the transmitted Bluetooth data 302 (block 536). The communications device 104 can then fragment the 802.11 data (including a possible acknowledgement or Request To Send/Clear To Send (RTS/CTS) exchange) to fit between the 1250 μs time period between the transmitted HV2 data 302 (block 538).

Similarly, if the communications device 104 determines that the transmitted Bluetooth data includes HV3 data 306, the communications device 104 determines the timing of the HV3 data 306 (block 540). The communications device 104 can then fragment the 802.11 data 304 to fit between the transmitted HV3 data 306 (block 542). The communications device can then transmit the fragmented 802.11 data 304 during the time periods between the Bluetooth data 302, 306 (block 544).

One should note that, as discussed in more detail below, the determined Bluetooth timing data may be utilized for determining a falling edge of the Bluetooth data 302, 306 to further prevent interference. Additionally, as discussed in more detail below, transmitting the fragmented data may include beginning transmission of the 802.11 data a predetermined time after a falling edge of a Bluetooth data frame.

Figure 6:
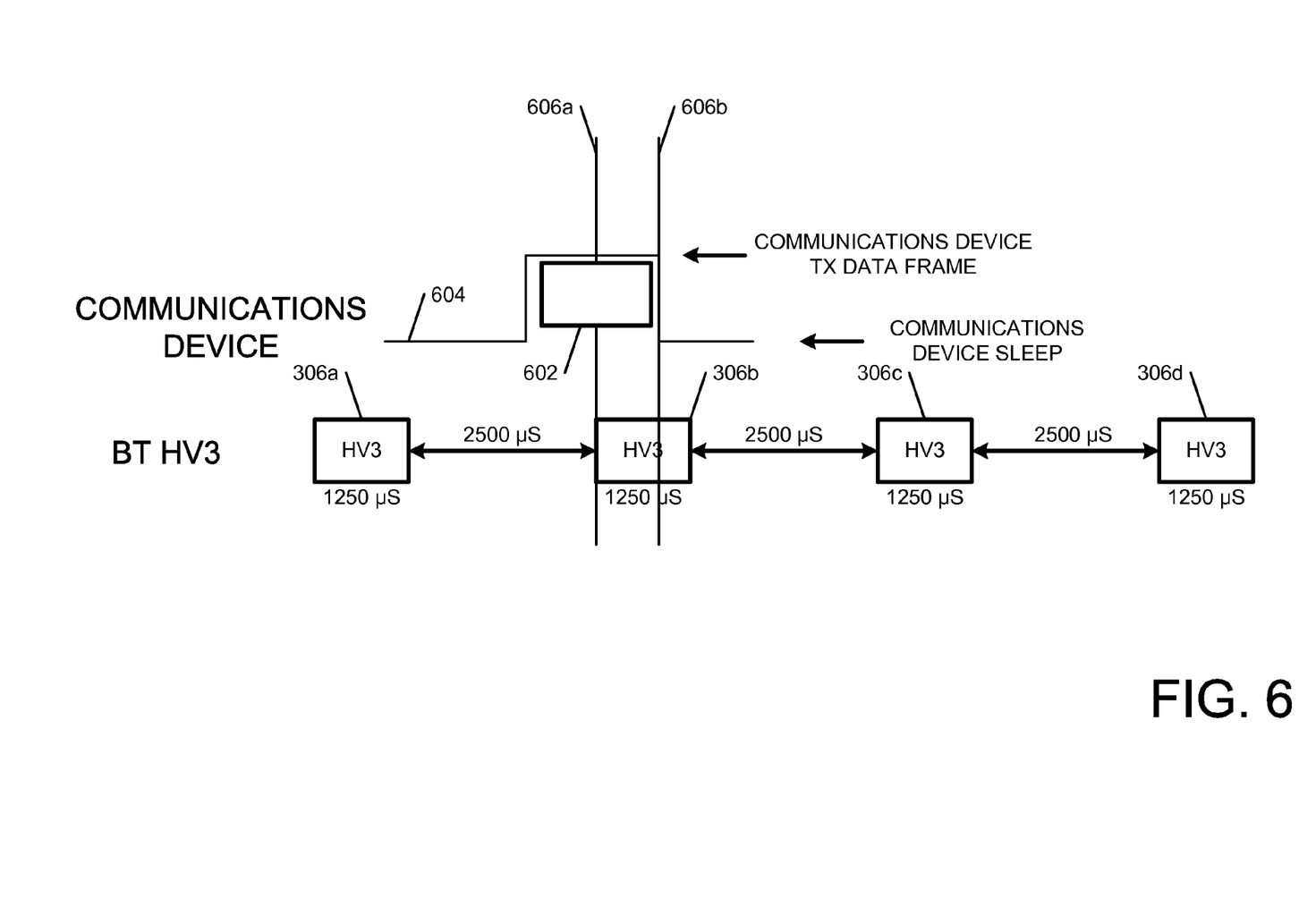
FIG. 6 is a diagram illustrating interference in communicating data via a plurality of protocols, such as in the network from FIG. 1.

FIG. 6 is a diagram illustrating interference in communicating data via a plurality of protocols, such as in the network from FIG. 1. As illustrated in the nonlimiting example of FIG. 6, Bluetooth data frames 306 may be transmitted sequentially at a regular interval. The PTA master component 208 (FIG. 2) may be configured to receive a request to transmit an 802.11 data frame 602. The PTA master component 208 may then determine whether a Bluetooth data frame 306 is currently being transmitted. If the PTA master component 208 determines that there is no Bluetooth data frame 306 currently being transmitted, the PTA master component 208 may send the 802.11 data frame 602 and, if not, facilitates transmission of the 802.11 data frame 602.

While such a configuration may reduce interference by transmitting 802.11 data (and/or other data) between Bluetooth data frames 306, such a configuration may still introduce interference if a Bluetooth data frame 306 is transmit after beginning transmission of the 802.11 data frame 602, but before transmission of that data frame 602 is complete.

FIG. 6 illustrates that the communications device 104 may enter a sleep mode, as illustrated by line 604. The PTA master component 208 determines that there is no Bluetooth data frame currently being transmitted. The communications device 104 may then resume normal operation, facilitate transmission of the 802.11 data frame 602 and, when transmission is complete, returns to sleep mode. However, as illustrated by vertical lines 606a and 606b, a Bluetooth data frame 306b began transmission during transmission of the 802.11 data frame 602. During the time that both the Bluetooth data frame 306*b* and the 802.11 data frame 602, interference likely occurs.

Figure 7:
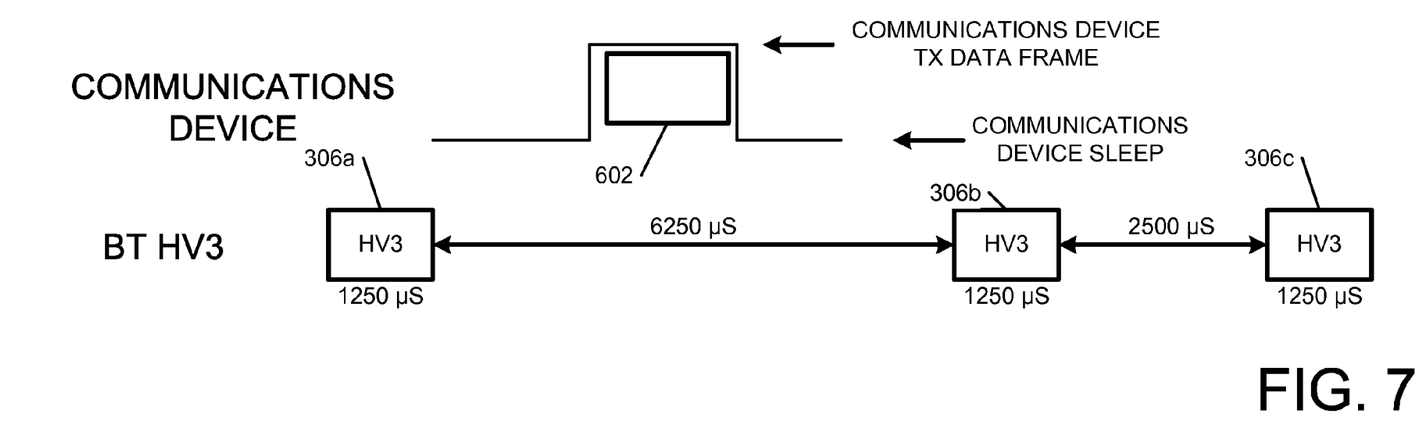
FIG. 7 is a diagram illustrating denying transmission of data to reduce interference between data from a plurality of protocols, similar to the diagram from FIG. 6.

FIG. 7 is a diagram illustrating denying transmission of Bluetooth data to reduce interference between data from a plurality of protocols, similar to the diagram from FIG. 6. As illustrated in the nonlimiting example of FIG. 7, in an effort to reduce the interference achieved in FIG. 6, many current solutions temporarily prevent transmission of the Bluetooth data frame 306*b* in order to complete transmission of the 802.11 data frame 602. However, oftentimes Bluetooth data 306 includes voice data and delaying transmission of this data may also cause quality issues with the communication.

Figure 8:
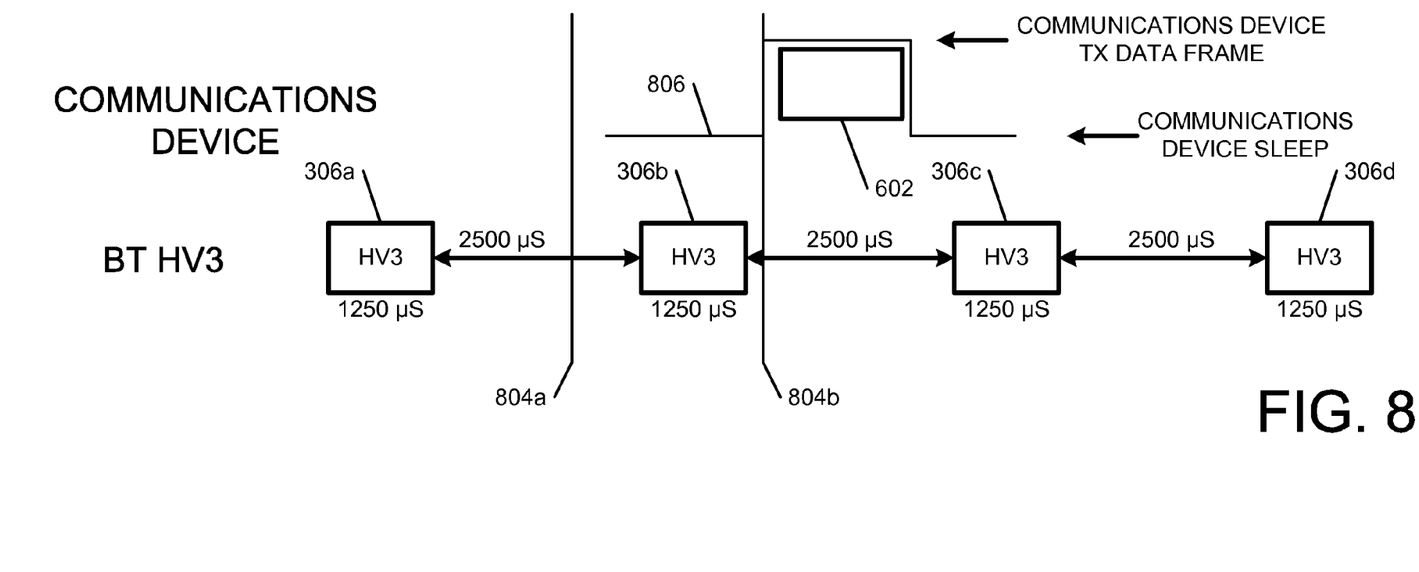
FIG. 8 is a diagram illustrating delaying transmission of data to reduce interference between data from a plurality of protocols, similar to the diagram from FIG. 6.

FIG. 8 is a diagram illustrating delaying transmission of data to reduce interference between data from a plurality of protocols, similar to the diagram from FIG. 6. As illustrated in the nonlimiting example of FIG. 8, the PTA master component 208 may be configured to determine whether a Bluetooth data frame 306 is currently being transmitted, as illustrated with vertical line 804*a*. However, in this nonlimiting example, the PTA master component 208 may be configured to determine a timing schedule of the Bluetooth data frames 306 such that the PTA master component can determine when the data frame 306*b* will be begin transmission and, thus, when the data frame 306*b* will end transmission. With this information, the communications device 104 can enter (or remain in) a sleep mode until the predicted time that the data frame 306*b* will end transmission (e.g., a falling edge). A predetermined time after the data frame 306*b* ends transmission (and/or slightly before the end of the transmission), the communications device 104 can enter a normal operation mode, begin transmission of the 802.11 data frame 602, and return to the sleep mode after transmission of the 802.11 data frame 602 is complete. In at least one nonlimiting example, the PTA master component 208 may be configured to postpone an 802.11 transmission when the 802.11 data will overlap with a Bluetooth slot.

Because the PTA master component 208 determines the previously set timing schedule of the of the Bluetooth data frames 306, the communications device 104 can determine a time to transmit the 802.11 data 602 without interference from the Bluetooth data 306. Additionally, with this information, the communications device 104 can save power by entering a sleep mode until the determined time that transmission of the data frame 306*b* will end.

Figure 9:
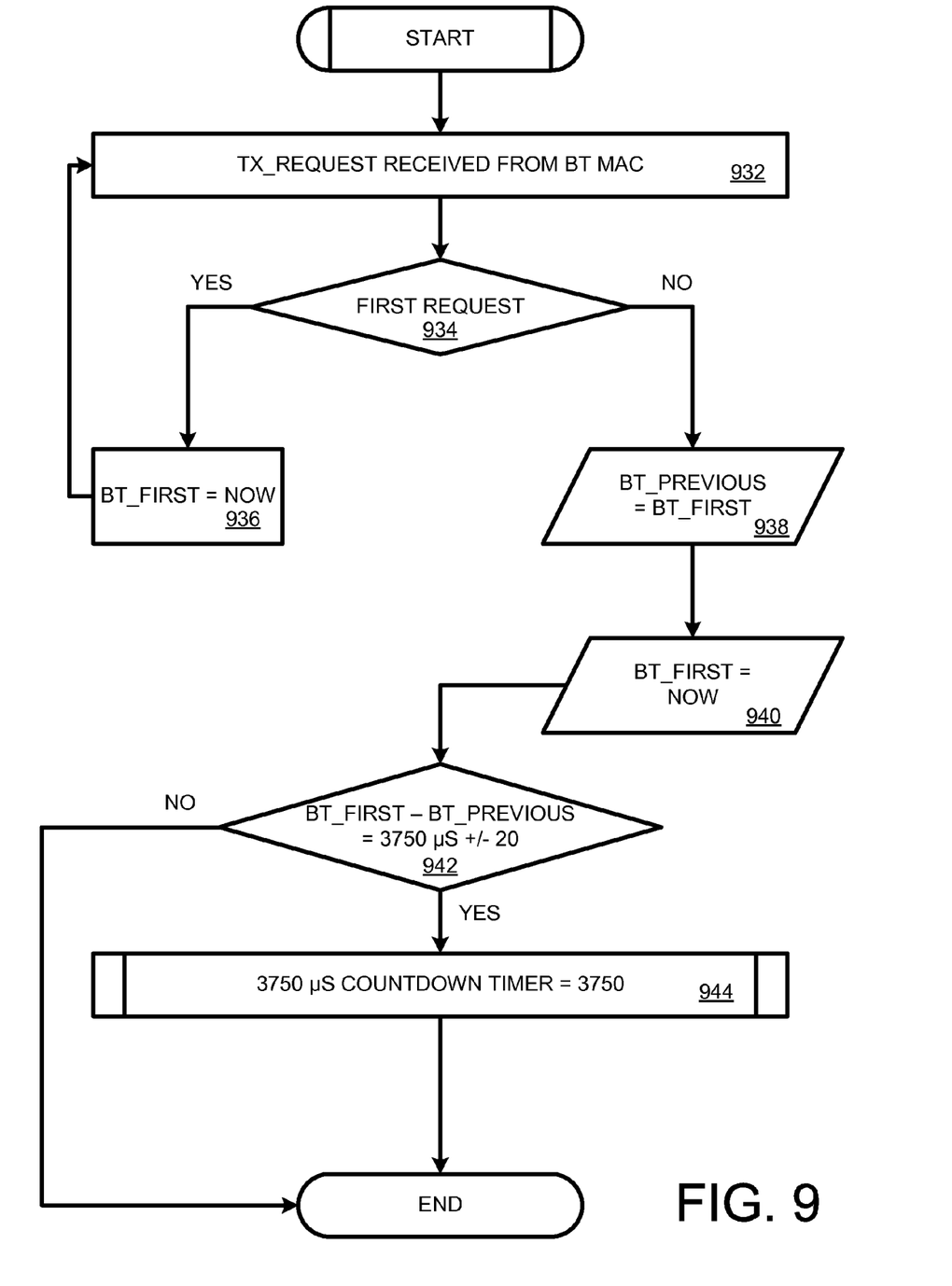
FIG. 9 is a flowchart illustrating an exemplary embodiment of a process that may be utilized in determining a time for sending 802.11 data, such as in the network from FIG. 1.

FIG. 9 is a flowchart illustrating an exemplary embodiment of a process that may be utilized in determining a time for sending 802.11 data, such as in the network from FIG. 1. As illustrated in the nonlimiting example of FIG. 9, the WLAN chipset 204 may be configured to receive a tx_request from the BT MAC component 214 (block 932). The WLAN chipset 204 can then determine whether this is the first request (block 934). If this tx_request is the first request, the WLAN chipset 204 sets a "BT_first" variable equal to a "now" variable (block 1036). This facilitates beginning capture of timing data for the transmitted Bluetooth data 306.

If, at block 934, the WLAN chipset 204 determines that this is not the first request, a "BT_previous" variable is set to a "BT_first" variable (block 938). The WLAN chipset 204 can also set a "BT_first" equal to the "now" variable (block 940). The WLAN chipset 204 can then determine whether "BT_first" minus "BT_previous" equals 3750 μs, plus or minus 20 (block 942). If not, the process may end. If, this equality is true, the WLAN chipset 204 sets the 3750 μs countdown timer to 3750 (block 944).

One should note that, while the exemplary embodiment of FIG. 9 illustrates determination of the timing schedule for HV3 data 302, this is a nonlimiting example. More specifically, a similar process may be utilized for HV2 data frames 306 and/or other repetitively transmitted data. Additionally, depending on the particular configuration, other processes may be utilized for determining the timing schedule of Bluetooth data frames 306 (and/or other data).

Figure 10:
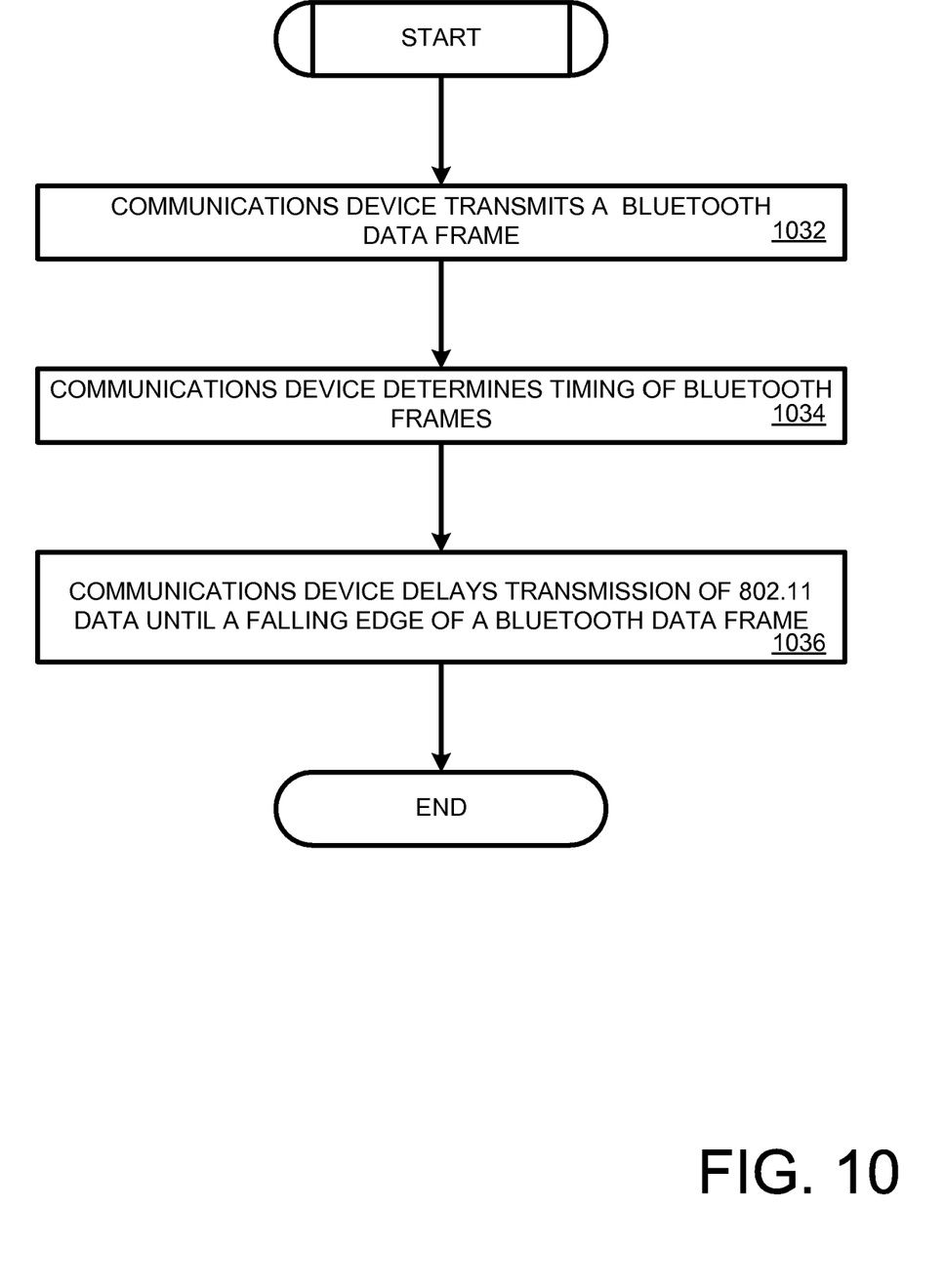
FIG. 10 is a flowchart illustrating an exemplary embodiment of a process that may be utilized in delaying transmission of 802.11 data, similar to the flowchart from FIG. 9.

FIG. 10 is a flowchart illustrating an exemplary embodiment of a process that may be utilized in delaying transmission of 802.11 data, similar to the flowchart from FIG. 9. As illustrated in the nonlimiting example of FIG. 10, the communications device 104 may transmit a Bluetooth data frame 302, 306 (block 1032). The communications device 104 can determine the timing schedule of the Bluetooth data frames 302, 306 (block 1034). The communications device 104 can then delay transmission of 802.11 data until a falling edge of a Bluetooth data frame 302, 306 (block 1036).

One should note that while the above description refers to Bluetooth and 802.11 data, these are nonlimiting examples. More specifically, other regularly and irregularly transmitted data may be included in this disclosure. Additionally, while certain devices are described as embodying various features of this disclosure, these are nonlimiting examples. More specifically, embodiments disclosed herein may be embodied in any wireless communication device, including computers (desktop, portable, laptop, etc.), consumer electronic devices (e.g., multi-media players), compatible telecommunications devices, personal digital assistants (PDAs), and/or other type of network devices, such as printers, fax machines, scanners, hubs, switches, routers, Set-Top Terminals (STTs), televisions with communications capabilities, etc.

Additionally, the embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should also note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A communications device for communicating data using a plurality of formats, comprising:
    first logic configured to transmit a plurality of first type data frames, the plurality of first type data frames being transmitted with a time period between transmitted first type data frames; and
    second logic configured to transmit a second type data frame, the second logic further configured to determine a duration of the time period between the transmitted first type data frames, the second logic further configured to fragment the second type data frame into a plurality of subframes such that the second type data subframes may be transmitted during the time period between the transmitted first type data frames, wherein fragmenting the second type data frame includes fragmenting the second type data frame into a predetermined number of subframes, the second logic further configured to fragment at least one of the subframes into a predetermined number second tier subframes.

2. The communications device of claim 1, wherein fragmenting the second type data frame includes determining a desired number of subframes that may be created from the second type data frame such that the subframes may be transmitted during the time period between the transmitted first type data frames.

3. The communications device of claim 1, wherein fragmenting the second type data frame includes determining whether the subframes may be transmitted during the time period between the transmitted first type data frames.

4. The communications device of claim 3, wherein, the second logic is configured to fragment at least one of the subframes into a predetermined number second tier subframes in response to determining that the subframes may not be transmitted during the time period between the transmitted first type data frames, the second logic further configured to determine whether the second tier subframes may be transmitted during the time period between the sequentially transmitted first type data frames.

5. The communications device of claim 1, wherein the second logic is further configured to transmit at least one of the subframes during the time period between the transmitted first type data frames.

6. The communications device of claim 1, wherein the second logic is further configured to determine a transmit schedule associated with the first type data frames and wherein the second logic is further configured to delay transmission of an second type subframe until a falling edge of a first type data frame.

7. The communications device of claim 6, wherein the communications device is configured to enter a sleep mode until a predetermined time before the falling edge of the first type data frame.

8. The communications device of claim 1, wherein the communications device includes at least one of the following: a wireless communication device, a consumer electronic device, a telecommunications device, a personal digital assistant (PDA), a printer, a fax machine, a scanner, a hub, a switch, a router, a Set-Top Terminal (STT), and a television.

9. A method for communicating data using a plurality of formats, comprising:
    transmitting a plurality of first format data frames, the plurality of first format data frames being transmitted with a predetermined time period between consecutively transmitted first format data frames;
    determining a duration of the time period between the consecutively transmitted first format data frames;
    fragmenting a second format data frame into a plurality of second format subframes such that the second format subframes may be transmitted during the time period between the consecutively transmitted first format data frames, wherein fragmenting the second type data frame includes fragmenting the second type data frame into a predetermined number of subframes; and
    fragmenting at least one of the subframes into a predetermined number second tier subframes.

10. The method of claim 9, further comprising determining a desired number of second format subframes that may be created from the second format data frame such that the second format subframes may be transmitted during the time period between the consecutively transmitted first format data frames.

11. The method of claim 9, wherein fragmenting the second format data frame includes determining whether the second format subframes may be transmitted during the time period between the consecutively transmitted first format data frames.

12. The method of claim 11, wherein fragmenting at least one of the second format subframes into a predetermined number second tier subframes is performed in response to determining that the second format subframes may not be transmitted during the time period between the consecutively transmitted first format data frames.

13. The method of claim 12, further comprising determining whether the second tier subframes may be transmitted during the time period between the transmitted first format data frames.

14. The method of claim 9, further comprising transmitting at least one of the second format subframes during the time period between the consecutively transmitted first format data frames.

15. The method of claim 9, further comprising determining a transmit schedule associated with the first format data frames and delaying transmission of a second format subframe until a falling edge of a first format data frame.

16. The method of claim 9, wherein the first format data frames include at least one of the following: Bluetooth High Quality Voice 2 (HV2) data frames and Bluetooth HV3 data frames, and wherein the second format data frame includes at least one of the following:
   an IEEE 802.11b data frame, an IEEE 802.11g data frame, an IEEE 802.11n data frame, and a WiMax data frame.

17. A method for facilitating communication of data via a plurality of formats, comprising:
   entering a sleep mode for a second format data;
   transmitting a plurality of first format data frames, the plurality of first format data frames being transmitted with a predetermined time period between consecutively transmitted first format data frames;
   determining a transmit schedule associated with the first format data frames;
   delaying transmission of the second format data frame a predetermined time after one of the plurality of first format data frames; and
   after the predetermined time, exiting the sleep mode and transmitting the second format data.

18. The method of claim 17, further comprising transmitting the second format data frame a predetermined time after the first format data frame.

19. The method of claim 17, wherein determining the transmit schedule associated with the first format data frames includes determining at least one of the following: a rising edge for beginning transmission, a falling edge for ending transmission, a transmission duration, and a duration of time between transmission of data frames.

20. The method of claim 17, further comprising determining whether the second format data frame may be transmitted in the time period between consecutively transmitted first format data frames.

21. The method of claim 17, wherein the first format data frames include at least one of the following: Bluetooth High Quality Voice 2 (HV2) data frames and Bluetooth HV3 data frames, and wherein the second format data frame includes at least one of the following:
   an IEEE 802.11b data frame, an IEEE 802.11g data frame, an 802.11n data frame, and a WiMax data frame.

22. A system for communicating data using a plurality of formats, comprising:
   means for transmitting a plurality of first format data frames, the plurality of first format data frames being transmitted with a predetermined time period between consecutively transmitted first format data frames;
   means for determining a duration of the time period between the consecutively transmitted first format data frames;
   means for fragmenting a second format data frame into a plurality of second format subframes such that the second format subframes may be transmitted during the time period between the consecutively transmitted first format data frames, wherein fragmenting the second type data frame includes fragmenting the second type data frame into a predetermined number of subframes; and
   means for fragmenting at least one of the subframes into a predetermined number second tier subframes.

23. The communications device of claim 22, wherein fragmenting the second type data frame includes determining a desired number of subframes that may be created from the second type data frame such that the subframes may be transmitted during the time period between the transmitted first type data frames.

* * * * *